Figure 1:
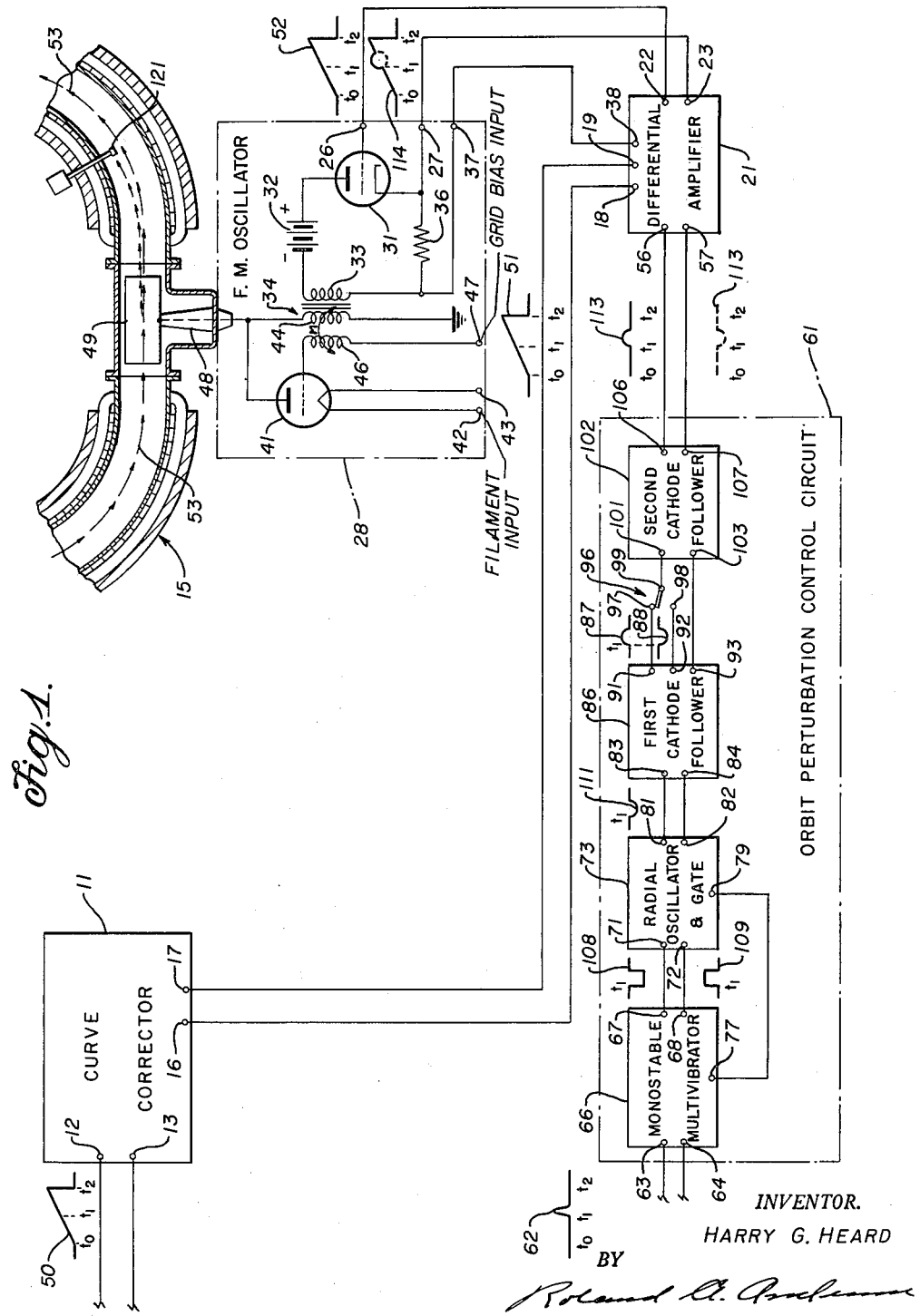

Oct. 24, 1961 H. G. HEARD 3,005,954
APPARATUS FOR CONTROL OF HIGH-ENERGY ACCELERATORS
Filed April 8, 1959 3 Sheets-Sheet 1

INVENTOR.
HARRY G. HEARD
BY
ATTORNEY.

Oct. 24, 1961 H. G. HEARD 3,005,954
APPARATUS FOR CONTROL OF HIGH-ENERGY ACCELERATORS
Filed April 8, 1959 3 Sheets-Sheet 2

INVENTOR.
HARRY G. HEARD
BY
ATTORNEY.

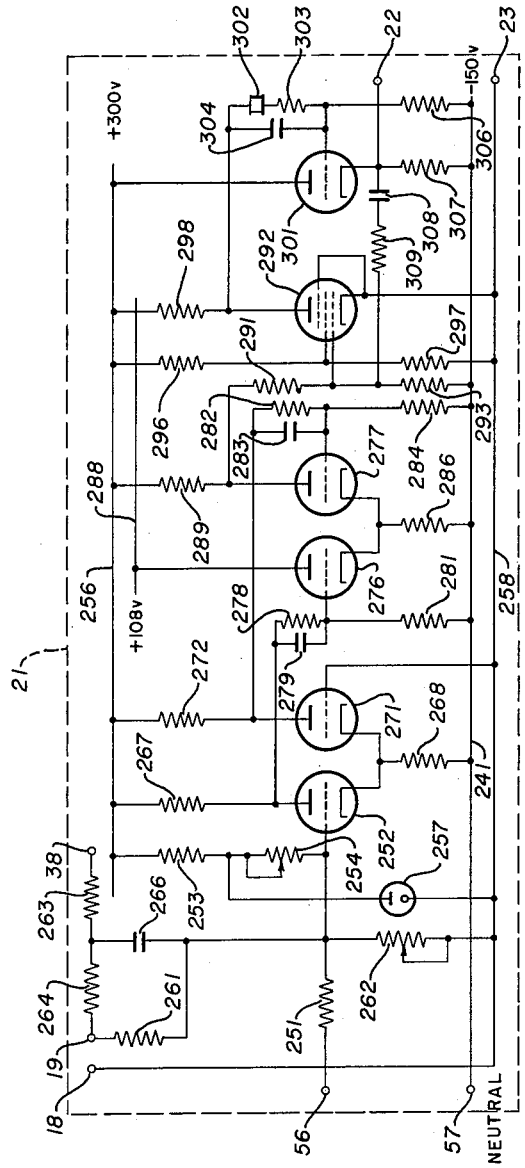

United States Patent Office 3,005,954
Patented Oct. 24, 1961

3,005,954
APPARATUS FOR CONTROL OF HIGH-ENERGY ACCELERATORS
Harry G. Heard, Berkeley, Calif., assignor to the United States of America as represented by the United States Atomic Energy Commission
Filed Apr. 8, 1959, Ser. No. 805,111
6 Claims. (Cl. 328—236)

The present invention relates to apparatus for control of a high-energy accelerator and, more particularly, to a pulse control system for deflecting the beam of an accelerator by a precisely timed alteration of the rate of change of frequency of the accelerating voltages.

High-energy particle accelerators of the synchrotron type are well known and include, in addition to the synchrotron, the Bevatron and Cosmotron. Such accelerators are described in "High-Energy Accelerators" by Stanley Livingston, Interscience Publishers, Inc., New York (1954). It has been found desirable to utilize a single beam pulse of an accelerator for more than one investigation or experiment, particularly where different energies of the beam particles are required. Several types of beam ejector methods and apparatus are known in the art, but in each instance the entire beam is involved.

It has been determined that, if the rate of change of frequency of the accelerating voltage is varied while the beam bunch is tracking on the nominal center line of the aperture of the acceleration vacuum chamber, the orbit diameter is expanded or contracted. Also, as long as the variation of the rate of change of frequency is slow in comparison to the period of phase oscillation, the particles in the bunch remain phase synchronous at a new radial position. The foregoing is set forth in particular with respect to a proton synchrotron known as the Bevatron which was disclosed in detail in a United States patent application, Serial No. 196,048 and subsequently published as an Abstract January 30, 1951, in the Official Gazette of the United States Patent Office, 642 OG 1480.

In order to accomplish the foregoing, a circuit, which generates a single alternation of a sine wave in response to a trigger pulse, is provided to alter the inductance of a reactor in the oscillator generating the acceleration voltage. The orbit of the beam bunch is then contracted or expanded in response to the trigger pulse and a portion of the beam strikes a target for a first investigative purpose. At the termination of the perturbance in the rate of change of frequency the beam bunch returns to the original orbit and is further accelerated to the final energy for a second investigative purpose.

It is therefore an object of the present invention to provide apparatus for beam position control in a high-energy accelerator.

Another object of the invention is to provide beam position control by introducing a perturbation in the rate of change of frequency of the accelerating voltage in a high-energy accelerator.

Still another object of the invention is to provide a high-energy accelerator for sequentially bombarding more than one target with a single beam bunch.

A further object of the invention is to provide a high-energy accelerator for sequentially bombarding a plurality of targets with a single beam bunch at respectively increased energies.

Another important object of the invention is to provide a circuit for developing a single alternation of a sine wave in response to a trigger pulse.

Figure 2:
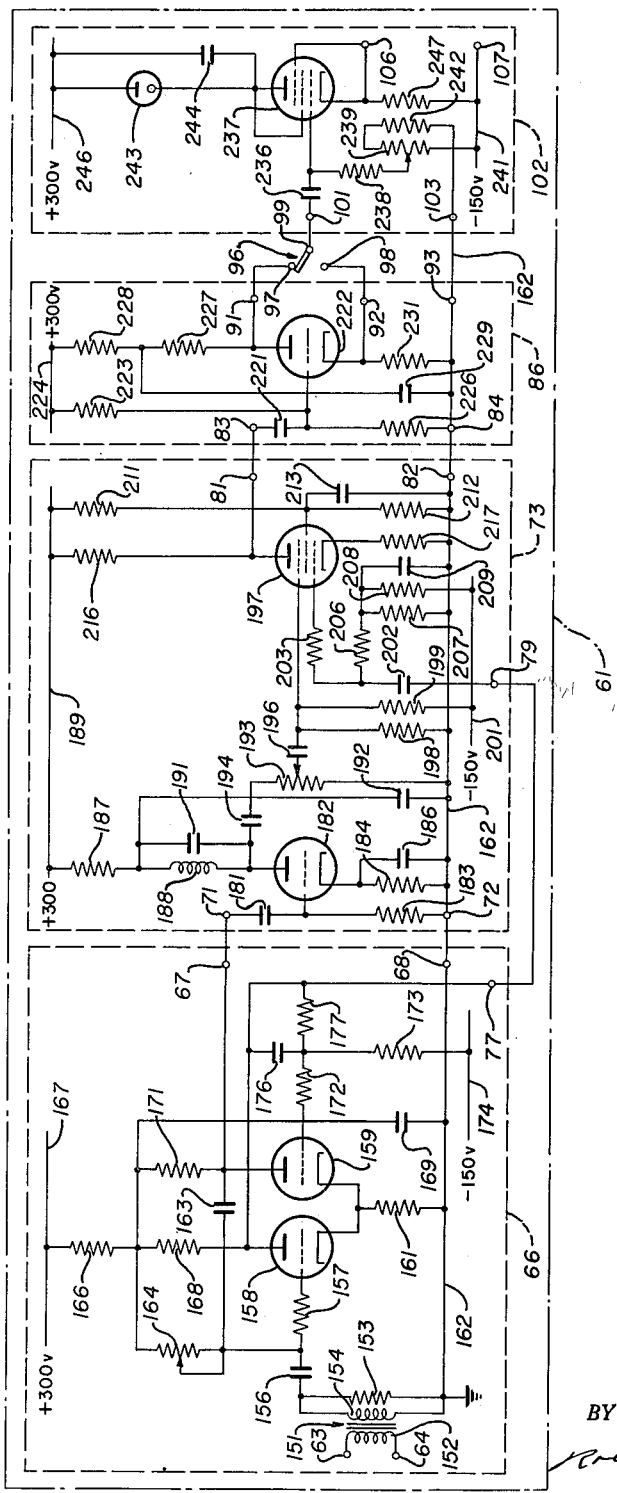

Other objects and advantages of the invention will be apparent in the following description and claims considered together with the accompanying drawing, in which:

FIGURE 1 is a block diagram of an orbit control system for an accelerator;
FIGURE 2 is a circuit diagram of the orbit perturbation control circuit of FIG. 1; and
FIGURE 3 is a circuit diagram of the differential amplifier circuit of FIG. 1.

Referring to the drawing in detail, FIG. 1 in particular, there is provided a curve corrector 11 having input terminals 12, 13, for connection to an external source of potential (not shown) that varies in a sawtooth manner proportional to the variation of current in the magnetic field of a proton synchrotron, such as the Bevatron 15 (partially illustrated). The curve corrector 11 is conventional and comprises circuitry substantially as disclosed in United States Patent No. 2,683,807, issued July 13, 1954, to G. D. Paxson, and entitled Variable Voltage Wave Form Generator. The output from such curve corrector 11 is developed across output terminals 16, 17 and is connected to input terminals 18, 19 of a differential amplifier 21. The sawtooth wave, corrected for deviations from the actual magnet current waveform, is amplified in the differential amplifier 21 and impressed from output terminals 22, 23, upon input terminals 26, 27, of a frequency modulated oscillator 28. A series type regulator tube 31 is provided with the control grid and cathode respectively connected to the two input terminals 26, 27. The anode of the series tube 31 is connected to the positive terminal of a power supply 32, the negative terminal of which is connected to one side of a direct current or control winding 33 of a saturable reactor 34. To complete the connection of such control winding 33, a resistor 36 is connected from the other side thereof to the cathode of the series tube 31 and a feedback connection is extended from the junction of the winding and resistor to a terminal 37. The feedback voltage is connected from the terminal 37 to a feedback terminal 38 of the differential amplifier 21. Referring again to the frequency modulated oscillator 28, an oscillator tube 41 is provided with the cathode-type filament leads connected to terminals 42, 43, respectively. The anode of the oscillator tube 41 is connected to one side of the alternating current winding 44 of the reactor 34, the other side of such winding being connected to ground. Feedback for the oscillator tube 41 is provided by a pickup coil 46 inductively coupled to the alternating current winding 44 and connected between the control grid and a terminal 47. Distributed capacitance in the anode circuit of the oscillator tube 41 together with the inductance of the alternating current winding 44 form a resonant tank circuit. The junction between the anode of the oscillator tube 41 and the alternating current winding 44 is connected through a feed-through insulator 48 to an accelerating electrode 49 of the proton synchrotron 15. Suitable operating potentials for the oscillator tube 41 are connected to the terminals 42, 43, 47 from a power supply (not shown).

In operation of the system, as described, a voltage of sawtooth waveform 50, impressed at the input terminals 12, 13, of the curve corrector 11, is applied, as a similar corrected waveform 51, to the differential amplifier 21 and appears as a control voltage waveform 52 at the control grid of the series tube 31 in the frequency modulated oscillator 28. The current flowing through the control winding 33 of the reactor 34 is accordingly varied to alter the value of inductance of the alternating current winding 44. Thus, the frequency at which the oscillator circuit oscillates is continuously altered to provide a frequency modulated accelerating voltage at the accelerating electrode 49 to increase the energy of particles traversing the electrode, while the varying magnetic field establishes the orbit of the particles (indicated by arrows 53 on FIG. 1).

Now, in accordance with the invention, an orbit perturbation control circuit 61 is connected to a second pair of input terminals 56, 57, of the differential amplifier 21 to add a distorting voltage to the output of the curve corrector 11 for a short duration of time and at a selected time. In brief, a trigger pulse 62, such as developed by a controllable delay multivibrator (not shown), is connected to input terminals 63, 64, of a monostable multivibrator 66 within the control circuit 61. Such multivibrator 66 is provided with a pair of output terminals 67, 68, which are connected to input terminals 71, 72, of an oscillator in a radial oscillator and gate circuit 73 and a third output terminal 77 which is connected to an input terminal 79 of a gate circuit in the radial oscillator and gate. A gated output is developed across output terminals 81, 82 of such unit 73 and applied to input terminals 83, 84, of a first cathode follower 86. Two pulses 87, 88, of opposite phase, are developed between two output terminals 91, 92 of the first cathode follower 86, and a common output terminal 93 of the first cathode follower 86. To select one of the pulses at a time a switch 96 is provided with a first stationary contact 97 connected to one of the output terminals 91, a second stationary contact 98 connected to the other terminal 92, and a movable contactor 99 connected to an input terminal 101 of a second cathode follower 102. A second input terminal 103 of the second cathode follower 102 is connected to the output terminal 93 of the first cathode follower 86. An output voltage is developed across two terminals 106, 107 of the second cathode follower and is coupled to the second input terminals 56, 57 of the differential amplifier 21.

With the components, described in the preceding paragraph, suitably connected in an operable manner, the occurrence of the trigger pulse 62 at a time $t_1$ after initiation of a pulse of charged particles in the accelerator at a time $t_0$, results in operation of the monostable multivibrator 66 to provide a negative-going square wave of voltage 108 and a positive-going square wave of voltage 109. Both of such voltages 108, 109 have a starting time $t_1$ corresponding to the pulse 62 and the duration of the voltages is equal and adjustable. In response to the two square wave voltages 108, 109 a single negative-going voltage alternation of a sine wave 111 is impressed from the radial oscillator and gate 73 upon the first cathode follower 86. Such single sine wave alternation 111 commences at the time $t_1$ and has a duration equal to the duration of the square wave voltages 108, 109. The above-mentioned adjustability of the square waves 108, 109 is provided to limit the output of the radial oscillator and gate 73 to a single alternation. The previously-mentioned positive-going sine wave alternation of voltage 87 and corresponding negative-going alternation 88 are respectively coupled from the first cathode follower 86 to the selector switch 96 which then connects the voltage alternation of desired sign (polarity) to the second cathode follower 102. The output of the second cathode follower 102 is then a single sine wave voltage alternation 113 as impressed upon the differential amplifier 21 and has the starting time $t_1$. The sine wave alternation 113 is added to the sawtooth waveform 51 to provide a waveform 114 at the oscillator 28 having a sawtooth appearance with the sine wave alternation superimposed to commence at time $t_1$. The rate of change of frequency of the oscillator 28 is then, accordingly, altered to no longer correspond to the rate of change of the magnet field of the accelerator 15 and the orbit of the particles is changed so that a portion of the particles strike a target 121. At the termination of the sine wave alternation of the voltage wave 114 the rate of change of frequency of the oscillator 28 returns to the original proportionality and the particles return to the previous synchronous orbit.

Referring now, in detail, to the orbit perturbation control circuit 61 shown in FIG. 2, it is to be noted that an input transformer 151 is provided, within the monostable multivibrator 66 with the primary winding 152 thereof connected between the input terminals 63, 64. A resistor 153 is connected across the secondary winding 154 of such transformer 151 with one end grounded and the other end coupled, through a series-connected coupling capacitor 156 and limiting resistor 157, to the control grid of a first triode type tube 158. A second triode type tube 159 is associated with the first tube 158 and the two tubes are interconnected to provide a monostable multivibrator. The cathode of each tube 158, 159 is directly connected to the other with a common resistor 161 connected from the junction to a ground bus 162 extended to the grounded connection between the secondary winding 154 and resistor 153. The junction between the series-connected capacitor 156 and resistor 157 is coupled to the anode of the second tube 159 by a coupling capacitor 163 and is further connected through a series-connected variable resistor 164 and fixed resistor 166 to a positive operating voltage bus 167. Thus, a normally positive voltage is applied to the control grid of the first triode tube 158, so that by connecting a dropping resistor 168 from the anode of the tube to the junction between the two series-connected resistors 164, 166 such tube is normally conductive. A by-pass capacitor 169 is connected from the junction of the two series-connected resistors to the ground bus 162.

Continuing the description of the monostable multivibrator 66, a dropping resistor 171 is connected between the anode of the second triode tube 159 and the junction of the two series-connected resistors 164, 166. A limiting resistor 172 and a grid resistor 173 are series-connected between the control grid of the second triode tube 159 and a negative voltage bus 174 to apply a normally negative voltage to the control grid and normally maintain the tube in a non-conductive state. To transfer voltage changes at the anode of the first triode tube 158 to the control grid of the second triode tube 159, a low impedance coupling circuit including a parallel-connected capacitor 176 and resistor 177 is connected between such anode and the junction between the limiting and grid resistors 172, 173. The final connections of the monostable multivibrator 66 are accomplished by connecting the anode of the first triode tube 158 to the output terminal 77, the anode of the second triode tube 159 to the output terminal 67, and the ground bus 162 to the output terminal 68.

In operation, the foregoing monostable multivibrator 66 is responsive to a positive-going input pulse, such as waveform 62 of FIG. 1. The transformer inverts the positive pulse 62 and applies the resulting negative pulse to the control grid of the first triode tube 158, which then is rendered non-conductive. The increasing anode voltage of the first triode tube 158 is coupled to the control grid of the second triode tube 159 and renders the latter tube conductive. The switch-over from one state to another of the two tubes 158, 159 occurs in the conventional manner for multivibrator circuits and is substantially simultaneous for both tubes. The duration of time of the second state is established by the circuit elements and is variable by adjustment of the variable resistor 164. There is therefore provided, in response to each positive-going pulse at the input terminals 63, 64, a negative-going square wave of voltage between the output terminals 67, 68 and a positive-going square wave of voltage between the output terminals 77, 68 (see waveforms 108 and 109, respectively, of FIG. 1).

As set forth previously, the output terminals 66, 68, 77 of the monostable multivibrator 66 are connected to corresponding input terminals 71, 72, 79 of the radial oscillator and gate 73. A coupling capacitor 181 is connected from the input terminal 71 to the control grid of a triode type tube 182 with a grid resistor 183 connected from the grid to the extended ground bus 162 at input terminal 72. A cathode resistor 184 with a parallel-connected by-pass capacitor 186 is connected between the cathode of the triode tube 182 and the ground bus 162. Thus, voltages appearing between the two input terminals 71, 72 are impressed between the grid and cathode of the triode tube 182. An operating voltage is applied to the anode of the tube 182 by a series-connected resistor 187 and inductor 188 connected in such order from a positive voltage bus 189 to the anode. A capacitor 191 is connected in parallel with the inductor 188 to provide a resonant tank circuit and a by-pass capacitor 192 is connected from the junction of the resistor 187 and inductor 188 to the ground bus 162.

Voltage variations at the anode of the triode tube 182 are coupled to one fixed end of a potentiometer 193 by a capacitor 194 with the other fixed end of such potentiometer connected to the ground bus 162. A second coupling capacitor 196 is connected between the adjustable element of the potentiometer 193 and the suppressor grid of a pentode type tube 197. To provide suitable bias to the suppressor grid of the pentode tube 197, a resistor 198 is connected from the suppressor grid to the ground bus 162 and a second resistor 199 is connected from the suppressor grid to a negative voltage bus 201. A series-connected coupling capacitor 202 and limiting resistor 203 is connected in such order between the third input terminal 79 and the control grid of the pentode tube 197. Also, to provide a suitable control grid bias one end of a resistor 206 is connected to the junction of the coupling capacitor 202 and limiting resistor 203 with the other end connected to two resistors 207, 208. One resistor 207 is connected to the ground bus 162 and the other resistor 208 is connected to the negative voltage bus 201 with a by-pass capacitor 209 connected between the junction of the two resistors 207, 208 and the ground bus. A suitable operating potential is supplied to the screen grid of the pentode tube 197 by connecting two series-connected resistors 211, 212 between the positive-voltage bus 189 and the ground bus 162 with the junction of the two resistors connected to the screen grid and a by-pass capacitor 213 connected from such junction to the ground bus. The remaining operating connections of the pentode tube 197 include a dropping resistor 216 connected between the positive voltage bus 189 and the anode and a cathode resistor 217 connected from the cathode to the ground bus 162. The output of the foregoing circuit is developed between the two output terminals 81, 82 with the anode of the pentode tube connected to one terminal 81 and the ground bus connected to the other terminal 82. Consider now the operation of the radial oscillator and gate 73 with connections as set forth in the preceding paragraphs. Under the condition of no impressed signal voltage, the triode tube 182 is conductive at a level established by the values of the circuit elements, and the pentode tube 197 is non-conductive because of a negative bias applied to both the control grid and the suppressor grid. A negative-going square wave of voltage at the input terminals 71, 72 from the monostable multivibrator 66 results in a sudden cessation of current flow through the triode tube 182, which shock excites the tank circuit (inductor 188 and capacitor 191) in the anode circuit, to produce a series of alternations of a sine wave voltage at the anode of the tube. The frequency and thus the wave length of the developed sine wave voltage is dictated by the values of the components of the tank circuit. The first alternation in each series is necessarily, in the present instance, positive-going and is applied in such form to the suppressor grid of the following pentode tube 197. The amplitude of the positive-going alternation as impressed on the suppressor grid of the pentode tube 197 is adjustable by the potentiometer 193 and is established to render that section of the tube in condition for conduction. Simultaneously a positive-going square wave of voltage appears between the third input terminal 79 and the grounded terminal 72 and is applied to the control grid of the pentode tube 197. Such pentode tube 197 then conducts during the time both grid sections are in a conductive state in the manner of a coincidence or modulator circuit. As set forth previously the duration of the output voltages of the monostable multivibrator 66 are adjustable by the variable resistor 164 and, to limit the period of conduction of the pentode tube 197 to the first positive alternation at the suppressor grid, such variable resistor is established to limit the output voltages to a period substantially equal to the period of the first positive alternation. Thus, the voltage alternation developed at the anode of the pentode tube is limited to correspond in time to the first positive alternation at the anode of the triode tube 182 and the remainder of the sine wave is prevented from passing to the output terminals 81, 82 where the voltage appears as a negative sine wave alternation.

The input terminals 83, 84 of the first cathode follower 86 are respectively connected to the output terminals 81, 82 of the radial oscillator and gate 73, as set forth previously. A coupling capacitor 221 is connected from one input terminal 83 to the control grid of a triode type tube 222 with a resistor 223 connected from the grid to a positive voltage bus 224 and a resistor 226 connected from the grid to the ground bus 162 extended from the other input terminal 84. Two series-connected resistors 227, 228 are connected between the anode of the tube 222 and the positive voltage bus 224 with a by-pass capacitor 229 connected from the junction of the two resistors to the ground bus 162. The final operational connection of the tube 222 is provided by a resistor 231 connected between the cathode and the ground bus 162. One output terminal 91 is connected to the anode of the tube 222, a second output terminal 92 is connected to the cathode of the tube, and a third output terminal 93 is connected to a continuation of the ground bus 162.

It is to be noted that the triode tube 222 is connected in the manner of a cathode follower with a take-off from the anode in addition to the usual cathode connection. The values of the resistors 223, 226 in the control grid circuit of the tube 222 are selected to provide a voltage above the cut-off point of the characteristic curve of the tube, which renders the tube normally conductive. Thus, at the time a negative alternation is impressed between the control grid and cathode of the tube 222 by the radial oscillator and gate 73, the tube becomes correspondingly less conductive. The cathode voltage follows the control grid voltage and thereby produces a negative alternation of voltage between the second and third output terminals 92, 93. While the control grid and cathode voltages decrease, the anode voltage increases to provide a positive alternation between the first and third output terminals 91, 93. Referring now to the previously described connections of the first two output terminals 91, 92 and the switch 96, it is apparent that either a negative alternation or a positive alternation is applied between the input terminals 101, 103 of the second cathode follower 102 in accordance with the position of the movable contactor 99.

A coupling capacitor 236 is connected between the input terminal 101 and the control grid of a pentode type tube 237. To impress a suitable bias upon the control grid, a limiting resistor 238 is connected from the grid to the adjustable element of a potentiometer 239 with one fixed end of the potentiometer connected to negative voltage bus 241 and the other fixed end connected to a continuation of the ground bus 162 through a resistor 242. The screen grid of the tube 237 is directly connected to the anode and the suppressor grid is directly connected to the cathode. To provide a substantially constant voltage at the anode of the tube 237 a parallel combination comprising a voltage regulator tube 243 and a capacitor 244 is connected between the anode and a positive voltage bus 246. To complete the operational connections of the tube 237 a resistor 247 is connected between the cathode and the negative voltage bus 241 with one output terminal 106 connected to the cathode and the other output terminal 107 connected to the negative voltage bus 241.

The above-described connections of the pentode tube 237 are conventional for cathode follower tube circuits. The setting of the adjustable element of the potentiometer 239 is established at a point to render the tube 237 normally conductive and, also, to determine the amplitude of the output between the terminals 106, 107. Since the connections are conventional, the operation of the second cathode follower 102 is also conventional and a positive alternation or a negative alternation of voltage appears at the output terminals 106, 107 in accordance with the selected position of the switch 96.

The output terminals 106, 107 of the second cathode follower 102 also serve as output terminals of the orbit perturbation and control circuit 61 and are connected, respectively to input terminals 56, 57 of the differential amplifier 21. Within such amplifier 21 (see FIG. 3) the input terminal 56 is connected by a limiting resistor 251 to the control grid of a first triode type tube 252. Bias is supplied to the control grid by a series-connected fixed resistor 253 and variable resistor 254 connected between the control grid and a positive voltage bus 256 with a voltage regulator tube 257 connected from the junction between the resistors to a neutral bus 258. The input terminal 18, connected externally to the curve corrector 11, is internally connected to the neutral bus 258 and the companion input terminal 19 is connected by a limiting resistor 261 to the control grid of the first triode tube 252 with an amplitude-determining variable resistor 262 connected from the control grid to the neutral bus 258. Also, a low-impedance coupling circuit comprising two series-connected resistors 263, 264 is connected between the feed-back input terminal 38 and the input terminal 19 with a capacitor 266 connected from the junction between such resistors and the control grid of the first triode tube 252. Thus, the voltage provided by the curve corrector 11, the feedback voltage from the osecillator 28, and the voltage from the orbit perturbation control circuit 61 are combined at the control grid of the first triode tube 252.

Further operating connections of the first triode tube 252 include a dropping resistor 267 connected from the anode to the positive voltage bus 256 and a cathode resistor 268 connected from the cathode to the negative voltage bus 241, extended from the input terminal 57. A second triode type tube 271, similar to the first triode tube 252, is provided with the cathode connected to the cathode of such first triode tube, the control grid connected to the neutral bus 258 and the anode connected by a dropping resistor 272 to the positive voltage bus 256. The first and second triode tubes 252, 271 and the described operating connections provide a low drift differential amplifier circuit.

A second differential amplifier circuit is provided and comprises a third triode type tube 276 and a fourth, similar, triode type tube 277. A low impedance coupling circuit comprising a parallel-connected resistor 278 and capacitor 279 is connected from the anode of the first triode tube 252 to the control grid of the third triode tube 276 with a resistor 281 connected from the grid to the negative voltage bus 241. A second low impedance coupling circuit comprising a parallel-connected resistor 282 and capacitor 283 is connected between the anode of the second triode tube 271 and the control grid of the fourth triode tube 277 with a resistor 284 connected from the grid of the latter tube to the negative voltage bus 241. The cathodes of the latter two tubes 276, 277 are connected together with a resistor 286 connected from such cathode connection to the negative voltage bus 241. The final operating connection of the third triode tube 276 is provided by a direct connection made between the anode and a second positive voltage bus 288 having a value of voltage less than that of the other positive voltage bus 256. A dropping resistor 289 is connected between the anode of the fourth triode tube 277 and the positive voltage bus 256 of higher value as the final operating connection for such tube.

A final stage amplifier is provided by connecting a limiting resistor 291 from the anode of the fourth triode tube 277 to the control grid of a pentode type tube 292 with a resistor 293 connected from the grid to the negative voltage bus 241. A voltage divider comprising two series-connected resistors 296, 297 is connected between the positive voltage bus 256 and the neutral bus 253 with the junction between the resistors connected to the screen grid of the pentode tube 292. A direct connection is made from the suppressor grid of the pentode tube 292 to the cathode and is extended to connect to the neutral bus 258. The anode connection of the tube 292 comprises a dropping resistor 298 connected from the anode to the positive voltage bus 256.

A cathode follower output circuit comprises a triode type tube 301 with a low impedance coupling circuit, having a thyrite crystal 302 connected in series with a resistor 303 and a capacitor 304 connected in parallel with the crystal and resistor combination, connected between the anode of the pentode tube 292 and the control grid of the triode tube. A grid resistor 306 is connected from the control grid of the triode tube 301 to the negative voltage bus 241. A direct connection is made from the anode of the triode tube 301 to the positive voltage bus 256 and a resistor 307 is connected from the cathode to the negative voltage bus 241. Also, a stabilizing feedback circuit, comprising a series-connected capacitor 308 and resistor 309, is connected from the cathode of the triode tube 301 to the control grid of the pentode tube 292. The output terminal 22 is connected to the cathode of the triode tube 301 and the other output terminal 23 is connected to the neutral bus 258.

The operation of the above-described circuits of the differential amplifier 21 are individually conventional and provide a single stabilized output voltage, which is a combination of the voltages impressed from the curve corrector 11 and the orbit perturbation control circuit 61.

The operating voltages, as carried by the various buses set forth in the description of the components, are obtainable from conventional power supplies (not shown) in relative values as stated, by way of example, on the various figures of the drawing.

With the circuit connected and suitably energized, in accordance with the foregoing description, the initiation of an acceleration cycle of the high-energy particle accelerator 15 provides an increasing voltage (see waveform 50 of FIG. 1) at the input of the curve corrector 11. Such increasing voltage, commencing at the initiation time $t_0$, is proportional to the current flowing through the magnet windings of the accelerator 15. The curve corrector 11 provides means for overcoming deviations from the correct proportionality relationship and impresses the corrected voltage (waveform 51) between the input terminals 18, 19 of the differential amplifier 21. The output voltage of the differential amplifier 21 in the absence of perturbation is a replica (see waveform 52) of the input from the curve corrector 11 and is impressed between the control grid and cathode of the series tube 31. Conduction through the series tube 31 is programmed by the control grid voltage (waveform 52) and so controls the flow of current through the direct current winding 33 of the saturable reactor 34. In turn, the flow of current through the direct current winding 33 controls the value of inductance of the alternating current winding 44 of the reactor 34. Since the alternating current winding 44 is in the anode circuit of the oscillator tube 41, the frequency at which the oscillator tube operates is established in a steadily varying manner. The output of the oscillator 28 is coupled to the accelerating electrode 49 of the accelerator 15 and the frequency of the impressed voltage alters continuously in proportion to the magnet current to maintain the particles in a constant orbit 53 during acceleration.

Now, at a time $t_1$, when the particles of the accelerator 15 have reached a particular energy and it is desired to utilize a portion of the beam to bombard a primary target 121, a trigger pulse (see waveform 62) is applied between the input terminals 63, 64 of the orbit perturbation control circuit 61 and the monostable multivibrator 66 thereof. As set forth previously, the trigger pulse 62 may be obtained from a variety of circuits, such as a controllable delay multivibrator (not shown), which is initially energized at the initiation time $t_0$ to produce the pulse at the exact time $t_1$. Such trigger pulse results in a switching action in the monostable multivibrator 66 so that the normally conducting first tube 158 becomes nonconducting and the normally non-conducting second tube 159 becomes conducting in the well-known multivibrator manner. The tubes 158, 159 remain in the switched condition for a time determined by the variable resistor 164 and the output voltage at the anode of the second tube 159 is a negative-going square wave (waveform 108) having the determined duration, which appears between one pair of output terminals 67, 68. Also, the anode voltage of the first tube 158 is a positive-going square wave (waveform 109) and appears between the other pair of output terminals 68, 77.

The negative-going square wave as impressed at the control grid of the first tube 182 of the radial oscillator and gate 73 results in a corresponding decrease in conduction of the tube to shock excite the resonant tank circuit at the anode. Such excitation of the tank circuit causes a series of sine wave alternations in the anode circuit, commencing with a positive alternation. To provide an output voltage having the form of a single sine wave alternation, the series of alternations is coupled to one grid of the pentode gate tube 197 and the positive-going square wave from the monostable multivibrator 66 is impressed upon a second grid of such tube. The circuit elements and applied potentials of the gate tube 197 require that both grids be driven above the cut-off value of the tube before conduction occurs. Thus, by setting the variable resistor 164 to limit the duration of the switching action of the monostable multivibrator 66 to the period of the first of the series of alternations, the gate tube is conductive for such period and only the one alternation is passed to the output terminals 81, 82.

Because of the voltage inversion characteristic of the gate tube 197, the voltage impressed at the input of the first cathode follower 86 is a negative-going sine wave alternation (waveform 111). The tube 222 is driven by the negative-going alternation to provide a positive-going alternation at the anode and a negative-going alternation at the cathode as outputs for the circuit (waveforms 87, 88, respectively).

The switch 96 is interconnected with the anode and cathode of the tube 222, to provide a selection as to which of the two polarities of alternation is applied to the second cathode follower 102. The operation of the second cathode follower 102 is conventional so that the output is substantially the same as the input and is applied as such to the input terminals 56, 57 of the differential amplifier 21. (Waveform 113 of FIG. 1 illustrates in solid line a selected positive alternation and in dash line the negative alternation.)

At the input circuit of the first differential amplifier stage (tubes 252, 271) the increasing voltage from the curve corrector 11 and the sine wave alternation of voltage from the orbit perturbation control circuit 61 are combined to provide a voltage, which at time $t_1$ is no longer proportional to the current flowing in the magnet windings of the accelerator 15 (waveform 114). Thus, the inductance of the alternating current winding 44 of the saturable reactor 34 is altered at variance with the normal manner previously described. The result is that the oscillator then oscillates at a frequency different from the frequency required to maintain the particles in a constant orbit during acceleration. With the change in the rate of frequency modulation, the orbit of the particles is correspondingly changed to cause a portion of the particles to strike the primary target 121. At the termination of the alternation voltage as added to the proportional voltage from the curve corrector 11, the rate of change of the frequency of the oscillator reverts to the previous value and the particles are again returned to the previous constant orbit for further acceleration. It is to be noted that the switch 96 provides selection of either the positive or negative-going alternation, which selection determines whether the orbit of the particles is expanded or contracted to strike the primary target depending upon the position thereof.

What is claimed is:

1. Control means for a charged particle accelerator employing a rising magnetic field and increasing accelerating voltage to accelerate particles in an orbit of constant radius comprising means producing a voltage pulse in timed relation to said increasing accelerating voltage, means including a radial oscillator and gate circuit for producing a half sine wave voltage from said voltage pulse, means producing a positive and negative counterpart of said half wave, and means selectively applying said positive and negative counterparts upon said rising accelerating voltage for varying the rate of change of accelerating voltage with respect to magnetic field in said accelerator to briefly vary the particle orbit therein whereby said beam is controllably directed in part upon target means during acceleration.

2. Beam control means for an orbital particle accelerator employing rising pulses of accelerating voltage in synchronism with a pulsed magnetic field to orbitally accelerate charged particles about a particular orbit comprising means producing a control half wave voltage pulse of substantially sinusoidal wave form and a duration that is small with relation to the duration of the accelerating voltage pulse, and means combining said control voltage pulse with said accelerating voltage pulse to produce a variation in the latter which thereby alters the instantaneous relation between rate of change of accelerating voltage with respect to magnetic field whereby the beam orbit is rapidly perturbed to swing the beam from the normal orbit and back again so that the beam is in part usably removable prior to full beam acceleration.

3. Beam control means as claimed in claim 2 further defined by means including a switch for combining said control voltage pulse with said accelerating voltage pulse in adding or subtracting relation to thereby control said beam to traverse an orbit of decreased or increased radius respectively.

4. Beam control means as claimed in claim 2 further defined by said means producing a control voltage pulse comprising a monostable multivibrator adapted for actuation in timed relation to said accelerating voltage pulse for producing positive and negative square wave voltages of a duration that is short relative to the accelerating pulse duration, a radial oscillator and gating circuit receiving said square wave voltages and providing a single negative half cycle sinusoidal voltage pulse therefrom, a first cathode follower circuit connected to receive said negative sinusoidal voltage pulse and producing therefrom a pair of like voltage pulses of opposite polarity, a second cathode follower circuit connected through switching means to said first cathode follower circuit for impressing upon the former a selected one of the voltage pulses from the latter, a differential amplifier connected to said second cathode follower circuit and receiving said accelerating voltage pulse for combining the control voltage pulse of selected polarity with said accelerating voltage pulse for producing a modified accelerating voltage pulse having a predetermined variation in the rising portion of the accelerating pulse, and means impressing this modified accelerating pulse upon the accelerator.

5. High energy accelerator control means comprising means developing a sawtooth accelerating voltage pulse in synchronism with a rising magnetic field in an orbital particle accelerator, a curve correction circuit modifying said accelerating voltage in accordance with said magnetic field to accelerate charged particles in an orbit of constant radius in the accelerator, a frequency modulated oscillator receiving said modified accelerating voltage and energizing accelerating means in the accelerator, a monostable multivibrator adapted to receive a signal synchronized with said accelerating voltage and producing square wave output signals, a sine wave generator energized from said multivibrator producing a single polarity half wave pulse for each input pulse, a differential amplifier connected between said curve correction circuit and said frequency modulated oscillator and receiving said half wave sinusoidal pulse for combining same with said accelerating voltage pulse to further modify the rising portion thereof to thereby perturb the beam orbit in a predetermined and controllable manner for a limited portion thereof whereby said beam is in part removable during acceleration.

6. Control means as claimed in claim 5 further defined by means impressing said half wave sinusoidal pulse upon said differential amplifier in selected polarity whereby the beam orbit is selectively deflected to greater or lesser radii.

References Cited in the file of this patent

UNITED STATES PATENTS

| | | |
|---|---|---|
| 2,480,169 | Westendorp | Aug. 30, 1949 |
| 2,626,351 | Powell | Jan. 20, 1953 |
| 2,658,999 | Farly | Nov. 10, 1953 |